2,883,367
Patented Apr. 21, 1959

2,883,367

ADDUCTS OF POLYETHYLENE AND FUMARATES

Joachim Dazzi, Dayton, Ohio, assignor to Monsanto Chemical Company, St. Louis, Mo., a corporation of Delaware No Drawing. Application January 4, 1954
Serial No. 402,150

6 Claims. (Cl. 260—78.4)

This invention relates to high molecular weight adducts and more particularly provides high molecular weight compounds having a plurality of carboxylate radicals and a process for producing the same.

An object of the invention is the provision of new and useful polycarboxylates. Another object of the invention is the preparation of high molecular weight polycarboxylates from polyethylene. A further object of the invention is to provide for the synthetic resins and plastics, rubber, coatings and textile industries a new class of high molecular weight polycarboxylates.

These and other objects of the invention hereinafter disclosed are provided by the following invention wherein there are prepared adducts of polyethylene and a fumarate having the formula

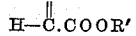

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals, from 0.5 percent to 5 percent of each of the ethylene units of said polyethylene being combined with 1 mole of said fumarate.

Fumarates having the above formula and useful for the present purpose include, e.g., the simple alkyl fumarates such as methyl, ethyl, isopropyl, n-propyl, n-butyl, tert-butyl, isoamyl, n-hexyl, n-heptyl or isooctyl fumarate; the mixed alkyl fumarates such as ethyl methyl fumarate, methyl n-octyl fumarate and butyl 2-ethylhexyl fumarate; the simple alkoxyalkyl fumarates such as bis(2-methoxyethyl), bis(3-ethoxy-n-propyl), or bis-(4-butoxybutyl) fumarate; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol monoether such as ethyl 2-ethoxyethyl fumarate or n-amyl 3-propoxy-2-propyl fumarate, the hydroxyalkyl fumarates such as bis(2-hydroxyethyl)fumarate or n-propyl 3-hydroxypropyl fumarate; the alicyclic fumarates such as cyclopropyl fumarate, cyclopentyl fumarate and cyclohexyl fumarate or octyl cyclopentyl fumarate; the alkylmercaptoalkyl fumarates such as bis(4-ethylmercaptobutyl) fumarate; the aryl fumarates such as phenyl fumarate, β-naphthyl fumarate, 2-xenyl fumarate, or ethylphenyl fumarate or 2-ethoxyethyl β-naphthyl fumarate; the aralkyl fumarates such as benzyl fumarate or amyl benzyl fumarate, furfuryl fumarate, tetrahydrofurfuryl fumarate, phenyl furfuryl fumarate, etc.

Reaction of polyethylene with the fumarate to form the present adducts takes place readily by heating the polyethylene with the ester in the presence or absence of an inert diluent or solvent at ordinary or superatmospheric pressures. When operating at atmospheric pressure, temperatures of from, say, 125° C. to 300° C. and preferably of from 180° C. to 250° C. are used. When working with readily polymerizable fumerates, an inhibitor of polymerization may be incorporated into the reaction mixture. The number of carboalkoxy groups introduced into the macromolecule depends upon the nature of the individual ester used, and upon the reaction conditions employed. Generally, operation within the higher temperature ranges, i.e., at temperatures of above, say, 180° C. and below the decomposition point of any of the reactants leads to introduction of more carboalkoxy groups than does operation at the lower temperatures. Usually, the lower alkyl fumarates are more reactive than either the higher alkyl fumarates or the higher alkoxyalkyl fumarates. In view of the effect of the reaction conditions and nature of the fumarates upon the extent of carboalkoxylation, it is recommended that for each initial run there be experimentally determined the operating conditions which should be observed for obtaining the desired degree of carboalkoxylation.

Polyethylenes useful for the present purpose are the high-molecular weight, generally solid polymers obtained by high pressure polymerization of ethylene. Such polyethylenes may have a number average molecular weight of, say, from 1,000 to 15,000.

Since the presently useful esters are generally solvents for most polyethylenes, under the reaction conditions used, no extraneous solvent or diluent usually need be employed. However, in order to facilitate handling of some of the polymers, it may be advantageous to work with the polyethylene in an inert, extraneous diluent or solvent, e.g., a liquid hydrocarbon or a liquid derivative thereof such as benzene, xylene, or a high-boiling aliphatic hydrocarbon such as kerosene, halogenated aliphatic hydrocarbons, etc. When operating at atmospheric pressure such diluent is generally removed before reaction of the polyethylene with the fumarate occurs, due to the high temperature used. For successful reaction, the diluent may or may not be present. In order to avoid local overheating, the heating and distilling operations are conducted on the oil-bath.

The present adducts are waxy to hard, solid, substantially colorless products which may be used for a variety of industrial purposes. They differ essentially from the polyethylenes from which they are derived in respect to heat and solubility characteristics, depending upon the number and kind of fumarate radicals which have been added. The contemplated use of the polyethylene-fumarate adducts will determine the extent of carboalkoxylation desired. Adducts having a low proportion of carboalkoxy radicals, e.g., those in which from 1 to 3 percent of each of the ethylenic units of polyethylene are combined with one mole of fumarate, are advantageously employed as lubricants for facilitating processing of polymers, particularly as a release agent in processing polyvinyl chloride. Adducts having a higher proportion of carboalkoxy groups, on the other hand, may be usefully employed in polyvinyl chloride blends.

The invention is further illustrated, but not limited, by the following examples:

Example 1

A mixture consisting of 17 g. of a polyethylene known to the trade as "Alathon D" and having an average molecular weight of about 8,000 and 200 g. of ethyl fumarate was charged to a 3-necked flask equipped with stirrer, thermometer, inlet tube reaching to the bottom of the flask and a Dean-Stark trap carrying a reflux condenser. The mixture was heated in a nitrogen atmosphere for 6.5 hours at 215–220° C. (refluxing), and then allowed to stand overnight. The reaction mixture was then filtered and the precipitate was washed with hexane and then dried in a dessicator for 24 hours at room temperature. It was then oven dried at 50–60° C./10–15 mm. overnight. Because the dried material still had a diethyl fumarate odor, a 10 g. sample of the dried product was extracted with boiling methanol in a Sohxlet extractor. The residue thus obtained was dried to constant weight to give 5.08 g. of the waxy polyethylene-ethyl fumarate adduct analyzing 83.53% carbon, 13.02% hydrogen and (by difference) 4.45% oxygen. This indicates the presence of an adduct in which one in 45 of the ethylene units of the polyethylene has combined with 1 mole of the ethyl fumarate, i.e., about 2.2% of the ethylene units of the polymer have combined with 1 mole of the fumarate.

The present adduct was found to have a softening point of 103° C. and a melting point of 105° C., as against 108° C. and 115° C., the respective softening and melting points of "Alathon D," the initial polyethylene. The present adduct was partially soluble in dimethylformamide and in ethyl acetate.

*Example 2*

An adduct of polyethylene and ethyl fumarate was also prepared as follows:

A mixture consisting of 50 g. of the polyethylene used in Example 1 and 600 g. of ethyl fumarate was refluxed for 8.5 hours. The reaction mixture was then stirred while allowed to attain room temperature. The resulting mixture was slowly filtered and the precipitate thus obtained was allowed to stand in an open dish for 24 hours. It was then extracted with boiling methanol in a Sohxlet extractor for 18 hours to give a residue which was allowed to stand overnight at room temperature and then dried in a vacuum oven for 22 hours. There was thus obtained 59.5 g. of the waxy polyethylene-ethyl fumarate adduct, analyzing 82.74% carbon, 13.25% hydrogen and (by different) 4.01% oxygen.

Incorporation of the adduct, in a 1.2 percent concentration, into polyvinyl chloride improved ejection of moulded test specimens and facilitated processing in extrusion operations.

What I claim is:

1. An adduct of a preformed homopolymeric ethylene having an average molecular weight of from 1,000 to 15,000 and a fumarate ester having the formula

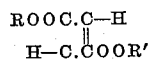

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals, from 0.5 percent to 5 percent of each of the ethylene units of said homopolymeric ethylene being combined with 1 mole of said fumarate, said adduct being obtained by heating the homopolymeric ethylene with the ester at a temperature of from 180° C. to 250° C. at atmospheric pressure and in the absence of a catalyst of polymerization.

2. An adduct of a preformed homopolymeric ethylene having an average molecular weight of from 1,000 to 15,000 and a dialkyl fumarate in which the dialkyl radical has from 1 to 8 carbon atoms, from 0.5 percent to 5 percent of each of the ethylene units of said homopolymeric ethylene being combined with 1 mole of said fumarate, said adduct being obtained by heating the homopolymeric ethylene with the fumarate at a temperature of from 180° C. to 250° C. at atmospheric pressure and in the absence of a catalyst of polymerization.

3. An adduct of a preformed homopolymeric ethylene having an average molecular weight of from 1,000 to 15,000 and diethyl fumarate, from 0.5 percent to 5 percent of each of the ethylene units of said homopolymeric ethylene being combined with 1 mole of said fumarate, said adduct being obtained by heating the homopolymeric ethylene with the fumarate at a temperature of from 180° C. to 250° C. at atmospheric pressure and in the absence of a catalyst of polymerization.

4. The method which comprises heating a preformed homopolymeric ethylene having an average molecular weight of from 1,000 to 15,000 with a fumarate ester having the formula

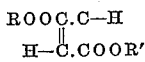

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals, and recovering from the resulting reaction product an adduct in which each of from 0.5 percent to 5 percent of the ethylene units of said homopolymeric ethylene have combined with one mole of said fumarate, said heating being conducted at a temperature of from 180° C. to 250° C. at atmospheric pressure and in the absence of a polymerization catalyst.

5. The method which comprises heating a preformed homopolymeric ethylene having an average molecular weight of from 1,000 to 15,000 with a dialkyl fumarate in which the alkyl radical has from 1 to 8 carbon atoms and recovering from the resulting reaction product an adduct in which each of from 0.5 percent to 5 percent of the ethylene units of said homopolymeric ethylene have combined with one mole of said fumarate, said heating being conducted at a temperature of from 180° C. to 250° C. at atmospheric pressure and in the absence of a polymerization catalyst.

6. The method which comprises heating a preformed homopolymeric ethylene having an average molecular weight of from 1,000 to 15,000 with diethyl fumarate and recovering from the resulting reaction product an adduct in which each of from 0.5 percent to 5 percent of the ethylene units of said homopolymeric ethylene have combined with one mole of said fumarate, said heating being conducted at a temperature of from 180° C. to 250° C. at atmospheric pressure and in the absence of a polymerization catalyst.

References Cited in the file of this patent

UNITED STATES PATENTS

| | | |
|---|---|---|
| 2,200,429 | Perrin et al. | May 14, 1940 |
| 2,497,323 | Roedel | Feb. 14, 1950 |
| 2,766,214 | Erchak et al. | Oct. 9, 1956 |

OTHER REFERENCES

Bawn: "The Chemistry of High Polymers," page 20, Interscience Pub. Inc., N.Y., 1948.